(12) United States Patent
Zhou et al.

(10) Patent No.: US 12,704,880 B2
(45) Date of Patent: Aug. 11, 2026

(54) DISPLAY DEVICE AND TELESCOPIC MECHANISM THEREOF

(71) Applicant: BOE Technology Group Co., Ltd., Beijing (CN)

(72) Inventors: Pengfei Zhou, Beijing (CN); Shangchieh Chu, Beijing (CN); Yanyan Yang, Beijing (CN); Xinyu Wang, Beijing (CN); Song Zhang, Beijing (CN); Shiming Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 258 days.

(21) Appl. No.: 18/576,382

(22) PCT Filed: May 11, 2023

(86) PCT No.: PCT/CN2023/093677

§ 371 (c)(1),
(2) Date: Jan. 4, 2024

(87) PCT Pub. No.: WO2024/229839

PCT Pub. Date: Nov. 14, 2024

(65) Prior Publication Data

US 2025/0098087 A1 Mar. 20, 2025

(51) Int. Cl.
*G06F 1/16* (2006.01)
*H04M 1/02* (2006.01)

(52) U.S. Cl.
CPC .......... *G06F 1/1652* (2013.01); *G06F 1/1637* (2013.01); *H04M 1/0266* (2013.01); *H04M 1/0268* (2013.01)

(58) Field of Classification Search
CPC .... G06F 1/1652; G06F 1/1637; G06F 1/1624; H04M 1/0268; H04M 1/0266
See application file for complete search history.

(56) References Cited

U.S. PATENT DOCUMENTS 8,493,726 B2 * 7/2013 Visser .................... G09F 9/301 361/679.05
9,286,812 B2 * 3/2016 Bohn .................... G06F 1/1624
(Continued)

FOREIGN PATENT DOCUMENTS

CN 104851367 A 8/2015
CN 106601131 A 4/2017
(Continued)

*Primary Examiner* — Nidhi Thaker
(74) *Attorney, Agent, or Firm* — XSENSUS LLP

(57) ABSTRACT

A telescopic mechanism includes a fixed part, a movable part and a telescopic assembly, where the telescopic assembly includes m folding telescopic frames and m-1 balance connecting rod groups; two ends of the folding telescopic frame are connected to the fixed part and the movable part respectively, the m folding telescopic frames are disposed at intervals in a first direction, and the first direction is perpendicular to a telescoping direction of the telescopic assembly; and each balance connecting rod group is disposed between two adjacent folding telescopic frames, each balance connecting rod group includes at least one balance connecting rod, and two ends of each balance connecting rod are connected to the two adjacent folding telescopic frames respectively.

19 Claims, 11 Drawing Sheets

(56) References Cited

U.S. PATENT DOCUMENTS 9,756,757 B2 * 9/2017 Park ........................ H05K 7/16
9,864,412 B2 * 1/2018 Park ...................... G06F 1/1652
9,911,369 B2 * 3/2018 Kim .................... G09F 15/0025
10,321,583 B2 * 6/2019 Seo .......................... H04N 5/64
10,430,923 B2 * 10/2019 Lu ............................ G06T 3/40
10,564,676 B2 * 2/2020 Kwon ...................... H04N 5/64
10,789,863 B2 * 9/2020 Song ...................... H05K 1/028
11,730,288 B2 * 8/2023 Luo ..................... G09F 15/0012
361/807
12,058,825 B2 * 8/2024 Luo ....................... G06F 1/1652
12,174,666 B2 * 12/2024 Ahn ...................... G06F 1/1652
2005/0146498 A1 * 7/2005 Hemia .................. G06F 1/1652
345/156
2006/0082518 A1 * 4/2006 Ram ..................... G06F 1/1675
345/1.1
2009/0237872 A1 * 9/2009 Bemelmans .......... G06F 1/1684
361/679.01
2014/0247544 A1 * 9/2014 Ryu ........................ G09F 11/29
361/679.01
2016/0034000 A1 * 2/2016 Lee ....................... G06F 1/1652
361/749
2016/0147261 A1 5/2016 Bohn et al.
2019/0204874 A1 * 7/2019 Kim ........................ G09F 9/301
2020/0022269 A1 * 1/2020 Liao ....................... F16M 11/04
2020/0264660 A1 * 8/2020 Song ................... H04M 1/0237
2021/0349567 A1 11/2021 Qu et al.
2022/0066510 A1 * 3/2022 Cha ..................... H04M 1/0237
2023/0087798 A1 3/2023 Chu et al.
2023/0089831 A1 3/2023 Li et al.

FOREIGN PATENT DOCUMENTS

CN 109547591 A 3/2019
CN 111599278 A 8/2020
CN 113888969 A 1/2022
CN 216595880 U 5/2022
CN 114694488 A 7/2022
CN 217061324 U 7/2022
CN 115585369 A 1/2023
JP 2005-215648 A 8/2005
KR 2020-0081655 A 7/2020
KR 2022-0008738 A 1/2022

* cited by examiner

DISPLAY DEVICE AND TELESCOPIC MECHANISM THEREOF

CROSS-REFERENCE TO RELATED APPLICATION

This application is a US national stage of international application No. PCT/CN2023/093677, filed on May 11, 2023, the disclosure of which is incorporated herein by reference in its entirety.

TECHNICAL FIELD

Embodiments of the present disclosure relate to the field of display technologies, and in particular, to a display device and a telescopic mechanism thereof.

BACKGROUND OF THE INVENTION

Display devices are increasingly widely used and have become one of the most important tools in people's daily work and life. Slide-roll display devices are very popular due to high portability and large display area.

Currently, the slide-roll display device includes a flexible display screen and a telescopic mechanism bearing the flexible display screen. The telescopic mechanism includes a fixed part, a movable part and a telescopic assembly. The fixed part and the movable part are used to be connected to two opposite side edges of the flexible display screen, respectively. Two ends of the telescopic assembly are connected to the fixed part and the movable part respectively. The telescopic assembly includes at least two folding telescopic brackets that are disposed at an interval in a direction perpendicular to a telescoping direction of the telescopic assembly.

During telescoping of the telescopic assembly, the telescoping lengths of the two folding telescopic brackets may be inconsistent. As a result, the flexible display screen tilts, and may collide with a housing of the display device during tilting. This, on the one hand, negatively affects the user's operating experience, and, on the other hand, negatively affects the service life of the flexible display screen.

SUMMARY OF THE INVENTION

Embodiments of the present disclosure provide a display device and a telescopic mechanism thereof, which can improve the telescoping synchronization of folding telescopic frames and thus improve the user's operating experience and prolong the service life of the flexible display screen. The technical solutions are as follows.

In one aspect, embodiments of the present disclosure provide a telescopic mechanism. The telescopic mechanism includes a fixed part, a movable part and a telescopic assembly, where the fixed part and the movable part are used to be connected to two opposite side edges of a flexible display screen, respectively; the telescopic assembly includes m folding telescopic frames and m−1 balance connecting rod groups, where m is an integer and greater than 1; two ends of the folding telescopic frame are connected to the fixed part and the movable part respectively, the m folding telescopic frames are disposed at intervals in a first direction, and the first direction is perpendicular to a telescoping direction of the telescopic assembly; and each of the balance connecting rod groups is disposed between two adjacent folding telescopic frames among the m folding telescopic frames, each of the balance connecting rod groups includes at least one balance connecting rod, two ends of each balance connecting rod are connected to the two adjacent folding telescopic frames respectively, and the length direction of the balance connecting rod is identical with the first direction.

Optionally, the folding telescopic frame includes a plurality of folding units connected sequentially along the telescoping direction, where each of the folding units is provided with a translation part, and during telescoping of the folding telescopic frame, the distance between the translation part and a first centerline of the telescopic assembly does not change and the length direction of the first centerline is identical with the telescoping direction; and the balance connecting rod is connected between one translation part of a first folding unit and one translation part of a second folding unit, and the first folding unit and the second folding unit are two adjacent folding units in the first direction.

In some possible embodiments, the m folding telescopic frames include a first telescopic frame group and a second telescopic frame group, and the first telescopic frame group and the second telescopic frame group are symmetrically disposed about the first centerline; the first telescopic frame group includes a first folding telescopic frame and a second folding telescopic frame; a folding unit of the first folding telescopic frame is V-shaped and includes a first connecting rod and a second connecting rod, where one end of the first connecting rod and one end of the second connecting rod are connected through a first connecting part, and the second connecting rod is connected to one end of a first connecting rod of another folding unit of the first folding telescopic frame through a second connecting part; the second folding telescopic frame includes a third connecting rod and a fourth connecting rod, where one end of the third connecting rod and one end of the fourth connecting rod are connected through a third connecting part, the third connecting rod is parallel to the first connecting rod, the fourth connecting rod is parallel to the second connecting rod, the fourth connecting rod is connected to one end of a third connecting rod of another folding unit of the second folding telescopic frame through a fourth connecting part; and the second connecting part is a translation part of the first folding telescopic frame, and the fourth connecting part is a translation part of the second folding telescopic frame.

Optionally, the telescopic assembly further includes at least one synchronously-moved connecting rod connected between the first connecting part of the first folding telescopic frame and the second connecting part of the second folding telescopic frame.

Optionally, any of the first connecting part, the second connecting part, the third connecting part and the fourth connecting part includes a first connecting structure, a second connecting structure and a connecting plate, where the first connecting structure and the second connecting structure are fixedly connected to two adjacent connecting rods respectively in a corresponding folding telescopic frame, and the first connecting structure and the second connecting structure are both hinged to the connecting plate, and are perpendicular to the telescoping direction and the first direction relative to a rotation axis of the connecting plate.

Optionally, in at least one of the first connecting part, the second connecting part, the third connecting part and the fourth connecting part, each of outer side walls of the first connecting structure and the second connecting structure has a toothed structure, and the toothed structure of the first connecting structure and the toothed structure of the second connecting structure engage with each other.

In some other possible embodiments, the m folding telescopic frames include a first telescopic frame group and a second telescopic frame group, and the first telescopic frame group and the second telescopic frame group are symmetrically disposed about the first centerline; the first telescopic frame group includes a first folding telescopic frame, a folding unit of the first folding telescopic frame includes a first connecting rod and a second connecting rod, a middle part of the first connecting rod is hinged to a middle part of the second connecting rod, and one end of the first connecting rod is hinged to one end of a second connecting rod of another folding unit of the first folding telescopic frame; and a part where the middle part of the first connecting rod is hinged to the middle part of second connecting rod is the translation part of the first folding telescopic frame.

In still some other possible embodiments, the m folding telescopic frames include a first telescopic frame group, a second telescopic frame group and a third telescopic frame group, and the first telescopic frame group and the second telescopic frame group are symmetrically disposed about the first centerline; the first telescopic frame group includes a first folding telescopic frame, a folding unit of the first folding telescopic frame includes a first connecting rod and a second connecting rod; one end of the first connecting rod and one end of the second connecting rod are connected through a first connecting part, and the second connecting rod is connected to one end of a first connecting rod of another folding unit of the first folding telescopic frame through a second connecting part; the third telescopic frame group includes a third folding telescopic frame; any folding unit of the third folding telescopic frame includes a third connecting rod and a fourth connecting rod; a middle part of the third connecting rod is hinged to a middle part of the fourth connecting rod, and one end of the third connecting rod is hinged to one end of a fourth connecting rod of another folding unit of the third folding telescopic frame; and the second connecting part is the translation part of the first folding telescopic frame, and a part where the middle part of the third connecting rod is hinged to the middle part of the fourth connecting rod is a translation part of the third folding telescopic frame.

Optionally, in the telescoping direction, for any folding telescopic frame, one or more folding units exist between a first balance connecting rod and a second balance connecting rod, and the first balance connecting rod and the second balance connecting rod are two adjacent balance connecting rods in the telescoping direction.

Optionally, the telescopic assembly further includes at least one magnet, and a middle part of at least one balance connecting rod is connected to the at least one magnet.

Optionally, the telescopic assembly further includes a first connecting rod and a second connecting rod, one end of the first connecting rod and one end of the second connecting rod are both connected to a middle part of the balance connecting rod, the first connecting rod and the second connecting rod are disposed at two sides of the balance connecting rod respectively in the telescoping direction and are disposed at an interval in the first direction; and at least one magnet includes a first magnet and a second magnet, the first connecting rod is connected to the first magnet, and the second connecting rod is connected to the second magnet.

Optionally, a surface of the first connecting rod closer to the flexible display screen is provided with a first mounting groove, and the first magnet is disposed in the first mounting groove; and a surface of the second connecting rod closer to the flexible display screen is provided with a second mounting groove, and the second magnet is disposed in the second mounting groove.

Optionally, the telescopic mechanism further includes two telescopic slide rails, where the two telescopic slide rails are disposed at two sides of the telescopic assembly in the first direction; the telescopic slide rail includes a plurality of guide rails, the plurality of guide rails includes a first fixed guide rail, a second fixed guide rail and at least one intermediate guide rail; the at least one intermediate guide rail is connected sequentially between the first fixed guide rail and the second fixed guide rail; the first fixed guide rail is connected to the fixed part and the second fixed guide rail is connected to the movable part; each of the intermediate guide rail and the second fixed guide rail each includes a guide rail body and a limiting part, the guide rail body is provided with a sliding groove, and the limiting part and the sliding groove are disposed on two opposite sides of the guide rail body respectively; and a limiting part of a first guide rail is disposed in a sliding groove of the second guide rail, and the first guide rail and the second guide rail are two connected guide rails among the plurality of guide rails.

Optionally, the maximum size of the limiting part of the first guide rail in a second direction is a first size, a size of an opening of the sliding groove of the second guide rail in the second direction is a second size; and the first size is greater than the second size; and the second direction is perpendicular to the telescoping direction and the first direction.

Optionally, a first side face of the limiting part is provided with a clamping groove, the first side face is a side face of the limiting part further away from a guide rail body and the clamping groove extends from one end of the limiting part to the other end of the limiting part; and a groove bottom of the sliding groove is provided with a raised structure, and the raised structure is disposed in the clamping groove and disposed at one end of the sliding groove closer to the first fixed guide rail.

Optionally, the telescopic mechanism further includes a rear housing, and the telescopic assembly is disposed in the rear housing; the rear housing includes a plurality of sub-housings, and the sub-housing includes a bottom plate and two side plates which are connected to two opposite sides of the bottom plate respectively; and the plurality of sub-housings includes a first fixed sub-housing, a second fixed sub-housing, and at least one intermediate sub-housing, the first fixed sub-housing is connected to the fixed part, the second fixed sub-housing is connected to the movable part, and the at least one intermediate sub-housing is connected sequentially between the first fixed sub-housing and the second fixed sub-housing.

Optionally, an inner wall of a first side plate of a first sub-housing is provided with a first guide structure, an outer wall of a first side plate of a second sub-housing is provided with a second guide structure, the inner wall and the outer wall are at least partially opposite, the first guide structure matches the second guide structure, and the first sub-housing and the second sub-housing are two connected sub-housings among the plurality of sub-housings.

Optionally, the first guide structure is a guide groove, a length direction of the guide groove is identical with the telescoping direction, the second guide structure is a guide protrusion, and the guide protrusion is disposed in the guide groove.

Optionally, a bottom surface of the bottom plate of the second fixed sub-housing is provided with a bump, and the bottom surface is a surface of the bottom plate of the second fixed sub-housing further away from the flexible display screen; and each of a side edge of the bottom plate of the first fixed sub-housing and a side edge of the bottom plate of at least one intermediate sub-housing is provided with a make-way port matching the bump.

In another aspect, embodiments of the present disclosure provide a display device. The display device includes a flexible display screen and the telescopic mechanism described above, where the flexible display screen is connected to the telescopic mechanism.

The beneficial effects brought by the technical solutions provided in the present disclosure at least include the followings.

Two ends of the m folding telescopic frames are connected to the movable part and the fixed part respectively, when the movable part moves relative to the fixed part, the movable part can drive the m folding telescopic frames to extend or contract, so that the telescoping function of the telescopic mechanism is realized. One balance connecting rod group is disposed between any two adjacent folding telescopic frames, each balance connecting rod group includes at least one balance connecting rod, two ends of each balance connecting rod are connected to the two adjacent folding telescopic frames respectively, and the length direction of the balance connecting rod is identical with the first direction. In this way, the telescoping synchronization of the m folding telescopic frames can be improved, and the possibility of tilting of the two adjacent folding telescopic frames can be reduced.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions and advantages of the present disclosure, embodiments of the present disclosure are described in further detail below with reference to the accompanying drawings.

The terms used in the Detailed Description section of the present disclosure are merely used for explaining the embodiments of the present disclosure and are not intended to limit the present disclosure. Unless defined otherwise, technical terms or scientific terms used in the embodiments of the present disclosure should have the normal meaning understood by a person of general skill in the art. The terms “first”, “second”, “third” and similar terms used in the description and claims of the present disclosure do not denote any order, quantity, or importance, and are merely used to distinguish different components. Likewise, the term “one” or “a/an” and similar terms denote at least one, instead of limitation to quantity. The word “comprise” or “include” and similar terms mean that elements or objects appearing before the term “comprise” or “include” cover the listed elements or objects and its equivalents appearing after the term “comprise” or “include” while other elements or objects are not excluded.

Figure 1:
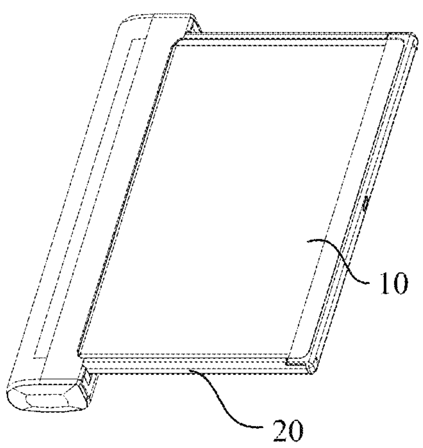
FIG. 1 is a structural schematic diagram of a display device in a first state according to an embodiment of the present disclosure.
Figure 2:
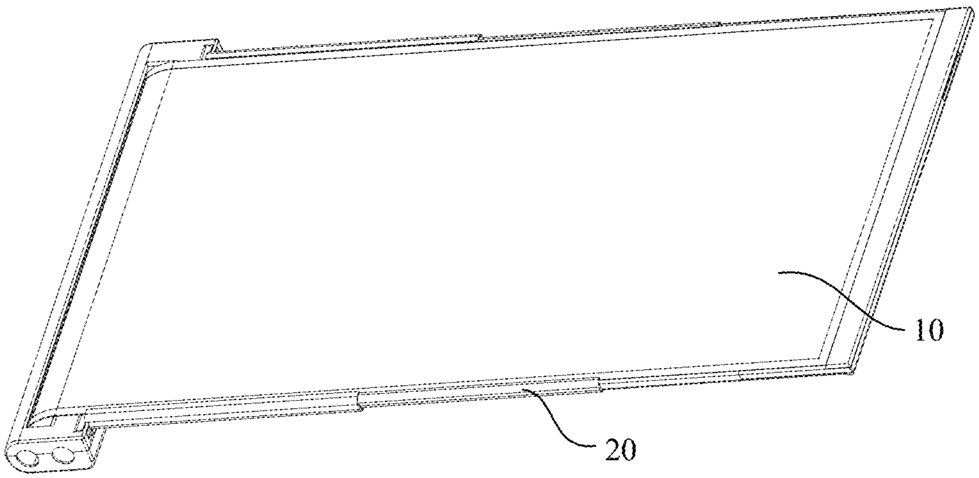
FIG. 2 is a structural schematic diagram of a display device in a second state according to an embodiment of the present disclosure.

FIG. 1 is a structural schematic diagram of a display device in a first state according to an embodiment of the present disclosure. FIG. 2 is a structural schematic diagram of a display device in a second state according to an embodiment of the present disclosure. As shown in FIG. 1 and FIG. 2, the display device includes a flexible display screen 10 and a telescopic mechanism 20. The telescopic mechanism 20 supports the flexible display screen 10.

When the display device is in the first state, the telescopic mechanism 20 is contracted and the flexible display screen 10 is at least partially accommodated in the telescopic mechanism 20. In this case, the volume of the display device is relatively small. The first state may be referred to as a contracted state or a closed state.

When the display device is in the second state, the telescopic mechanism 20 is extended and the flexible display screen 10 is spread on the telescopic mechanism 20, and a display region of the display device becomes larger. The second state may be referred to as an extended state or an open state.

Exemplarily, the area of the display region of the flexible display screen 10 when the display device is in the second state is n times the area of the display region of the flexible display screen 10 when the display device is in the first state, where n is greater than 1. For example, n is equal to 2 or 3. That is, when the display device is in the first state, $(n-1)/n$ of the flexible display screen 10 may be accommodated in the telescopic mechanism 20, and the rest $1/n$ of the flexible display screen 10 is exposed. In this case, the display device is used as a display device of a small size for users to watch.

Figure 3:
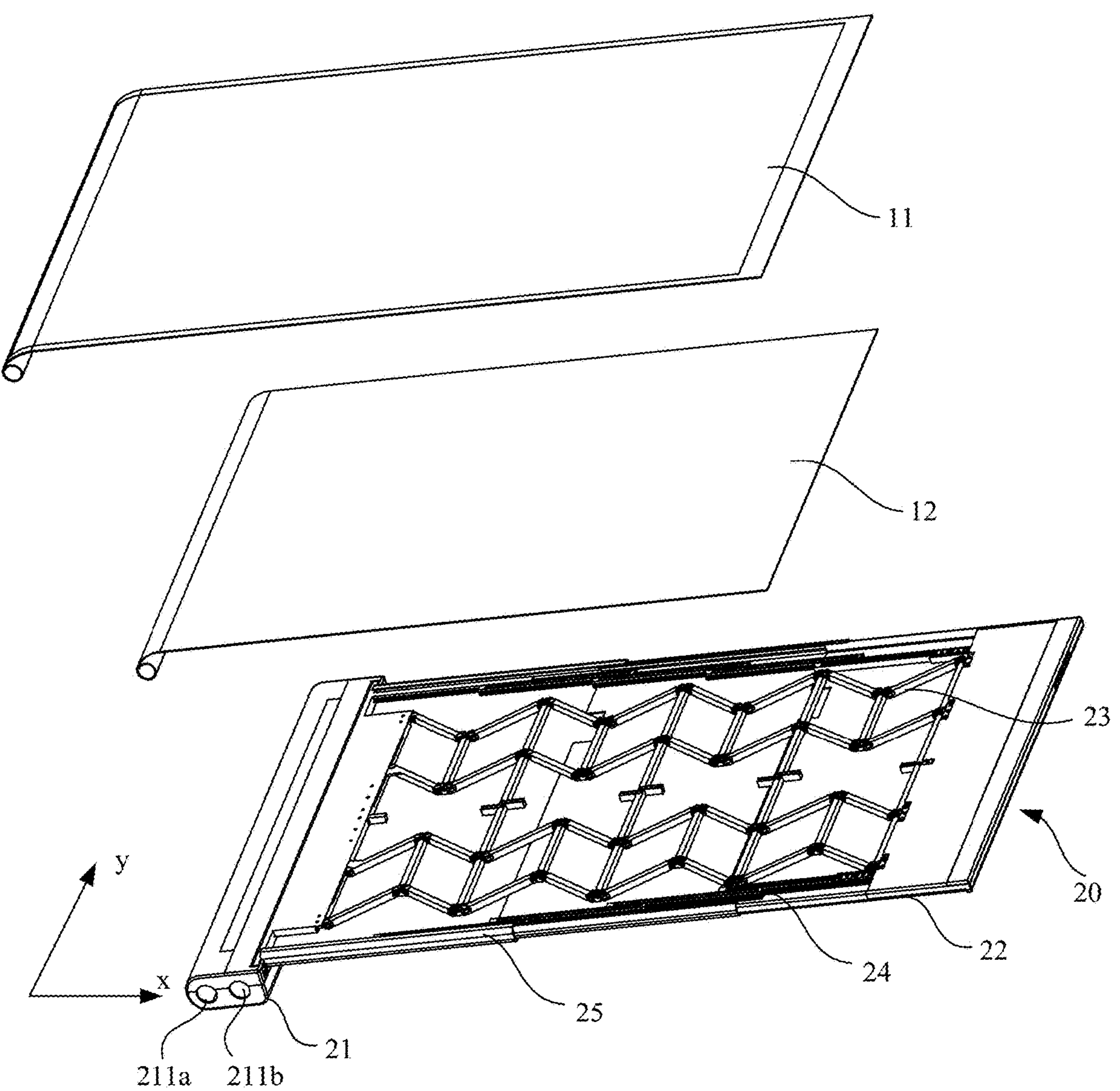
FIG. 3 is a stereoscopic exploded structural schematic diagram of the display device in FIG. 2.

FIG. 3 is a stereoscopic exploded structural schematic diagram of the display device according to the embodiment of the present disclosure. As shown in FIG. 3, the flexible display screen 10 includes a flexible display panel 11 and a support member 12. The flexible display panel 11 has a display surface and a non-display surface which are opposite to each other. The support member 12 is disposed on the non-display surface and used to support the flexible display panel 11.

When the display device is in the first state, a part of the flexible display panel 11 and a part of the support member 12 are both accommodated in the telescopic mechanism 20. When the display device is in the second state, the flexible display panel 11 and the support member 12 are both spread on the extended telescopic mechanism 20.

The type of the flexible display panel 11 is not limited in the embodiments of the present disclosure and the flexible display panel may be an organic light-emitting diode (OLED) display panel or the like.

Exemplarily, the support member 12 may be made of a metal material, such as a stainless steel material.

In some examples, the support member 12 includes a plurality of support plates disposed sequentially along a telescoping direction x of the telescopic mechanism 20 (not shown in the figure) and any two adjacent support plates are hinged, so that they can not only be accommodated together with the flexible display panel 11 in the telescopic mechanism 20, but also can support the spread flexible display panel 11.

The telescopic mechanism 20 includes a fixed part 21, a movable part 22 and a telescopic assembly 23. The fixed part 21 and the movable part 22 are connected to two opposite side edges of the flexible display screen 10, respectively. The telescopic assembly 23 is disposed between the fixed part 21 and the movable part 22, and is connected to the fixed part 21 and the movable part 22. The telescopic assembly 23 has a telescoping function and is capable of driving the fixed part 21 and the movable part 22 to move closer to or further away from each other.

Exemplarily, the fixed part 21 is provided with an accommodating space therein for accommodating the flexible display screen 10.

In some examples, a rolling assembly is disposed in the accommodating space and is used to roll the flexible display screen 10. Exemplarily, the rolling assembly includes two reels 211*a* and 211*b* disposed in parallel at an interval, and an axial direction of the reel 211*a* is perpendicular to a telescoping direction x of the telescopic assembly 23. The reel 211*a* is used for rolling the flexible display panel 11 and the reel 211*b* is used for rolling the support member 12.

In the related art, the telescopic assembly includes a plurality of folding telescopic frames, which are disposed at intervals in a first direction y. The first direction y is perpendicular to the telescoping direction x of the telescopic assembly and identical with the axial direction of the reel 211*a*. Due to assembly gaps among various components of the display device, asynchronous telescoping of various folding telescopic frames during telescoping of the telescopic assembly may occurs, resulting in inconsistent lengths of the various folding telescopic frames. This may cause the flexible display screen to tilt. When tilting seriously, the flexible display screen collides with a housing of the display device, which negatively affects the service life of the flexible display screen. Moreover, when the flexible display screen collides with the housing of the display device, the telescoping process of the telescopic mechanism would be paused, negatively affecting the user's operating experience.

For this purpose, in the embodiments of the present disclosure, at least one balance connecting rod is disposed between adjacent folding telescopic frames and the length direction of the balance connecting rod is identical with the first direction y, so that the telescoping synchronization of m folding telescopic frames can be improved and the lengths of the folding telescopic frames are relatively identical. In this way, the possibility of collision between the flexible display screen and the housing of the display device can be reduced, which is conductive to prolonging the service life of the flexible display screen and improving the user's operating experience.

Figure 4:
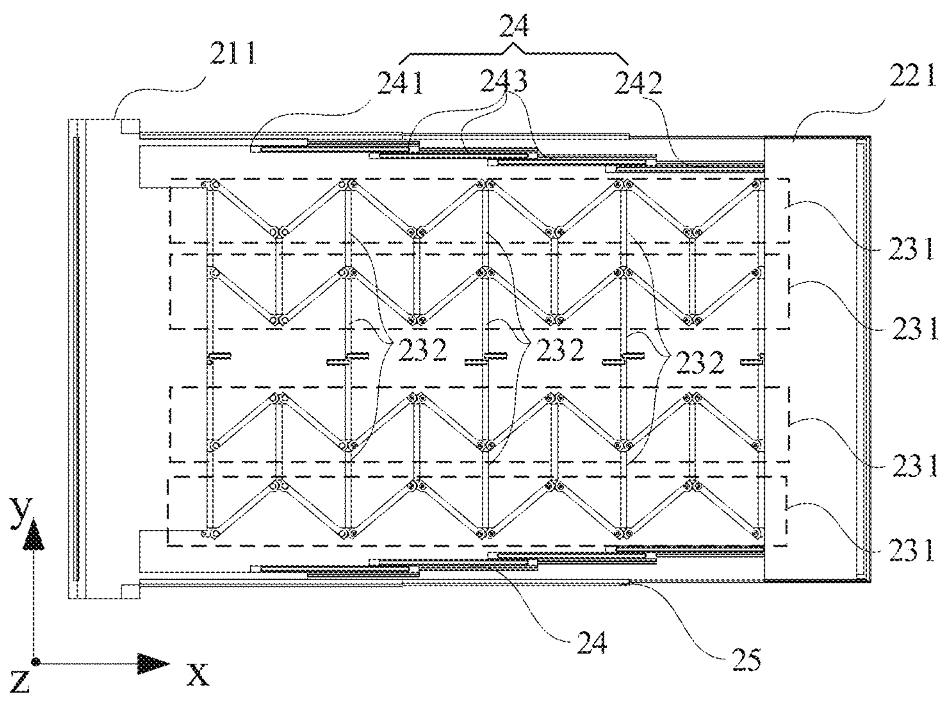
FIG. 4 is a structural schematic diagram of a telescopic assembly in an extended state according to an embodiment of the present disclosure.

FIG. 4 is a structural schematic diagram of a telescopic assembly in an extended state according to an embodiment of the present disclosure. As shown in FIG. 4, the telescopic assembly 23 includes m folding telescopic frames 231 and m−1 balance connecting rod groups, where m is an integer and greater than 1. The m folding telescopic frames 231 are disposed at intervals in the first direction y. Each balance connecting rod group is disposed between two adjacent folding telescopic frames 231 and one balance connecting rod group is disposed between every two adjacent folding telescopic frames 231. For example, in FIG. 4, m is equal to 4, three balance connecting rod groups are disposed among the four folding telescopic frames 231. In order from top to bottom, a first balance connecting rod group is disposed between a first folding telescopic frame 231 and a second folding telescopic frame 231, a second balance connecting rod group is disposed between the second folding telescopic frame 231 and a third folding telescopic frame 231, and a third balance connecting rod group is disposed between the third folding telescopic frame 231 and a fourth folding telescopic frame 231.

Each balance connecting rod group includes at least one balance connecting rod 232. Two ends of each balance connecting rod 232 are connected to two adjacent folding telescopic frames 231 respectively and the length direction of the balance connecting rod 232 is identical with the first direction y.

In the embodiments of the present disclosure, that the length direction of the balance connecting rod 232 is identical with the first direction y may refer to that the length direction of the balance connecting rod 232 is identical with the first direction y when the m folding telescopic frames 231 have the same length in the telescoping direction x.

Optionally, the telescopic assembly 23 further includes a fixed part middle frame 211 and a movable part middle frame 221. The fixed part middle frame 211 is at least partially disposed in a housing of the fixed part 21 and the movable part middle frame 221 is at least partially disposed in a housing of the movable part 22. Two ends of the folding telescopic frame 231 are connected to the fixed part middle frame 211 and the movable part middle frame 221 respectively, so that the two ends of the folding telescopic frame 231 are connected to the fixed part 21 and the movable part 22 respectively.

In other embodiments, the two ends of the folding telescopic frame 231 may also be connected to the housing of the fixed part 21 and the housing of the movable part 22 by fasteners (for example bolts).

As shown in FIG. 4, the telescopic assembly 23 includes four folding telescopic frames 231. In the embodiments of the present disclosure, the number of the folding telescopic frames 231 is not limited, and it may be adjusted according to an actual size of the flexible display screen, and it may be, for example, 2, 3, 5 or 6.

Figure 5:
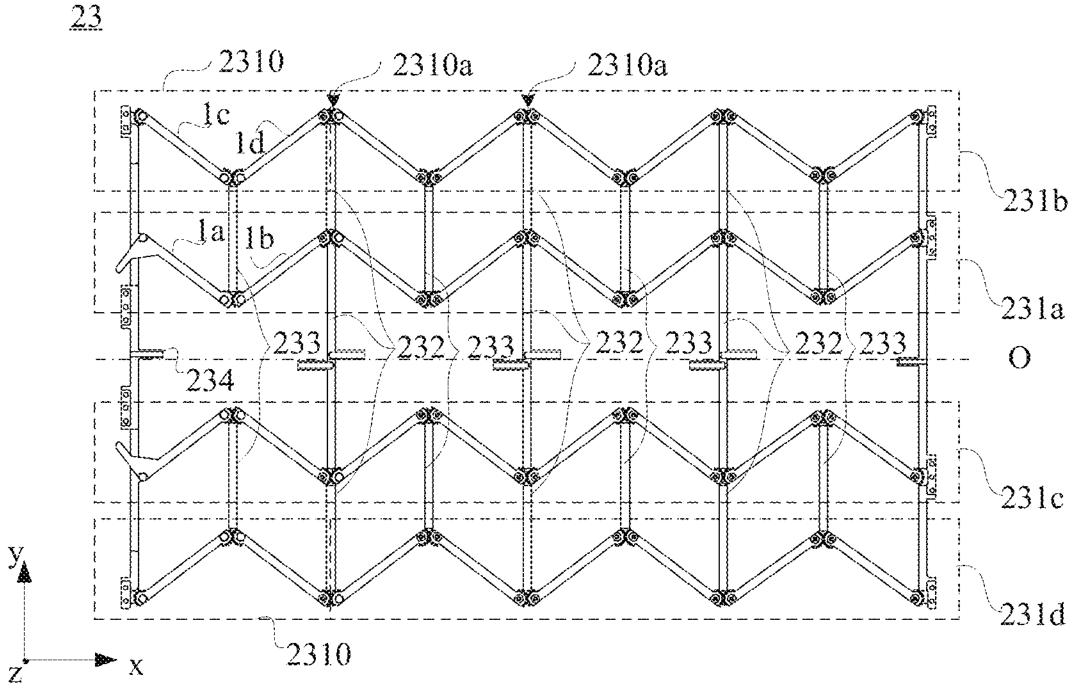
FIG. 5 is a structural schematic diagram of folding telescopic frames when the telescopic assembly is in the extended state according to an embodiment of the present disclosure.
Figure 6:
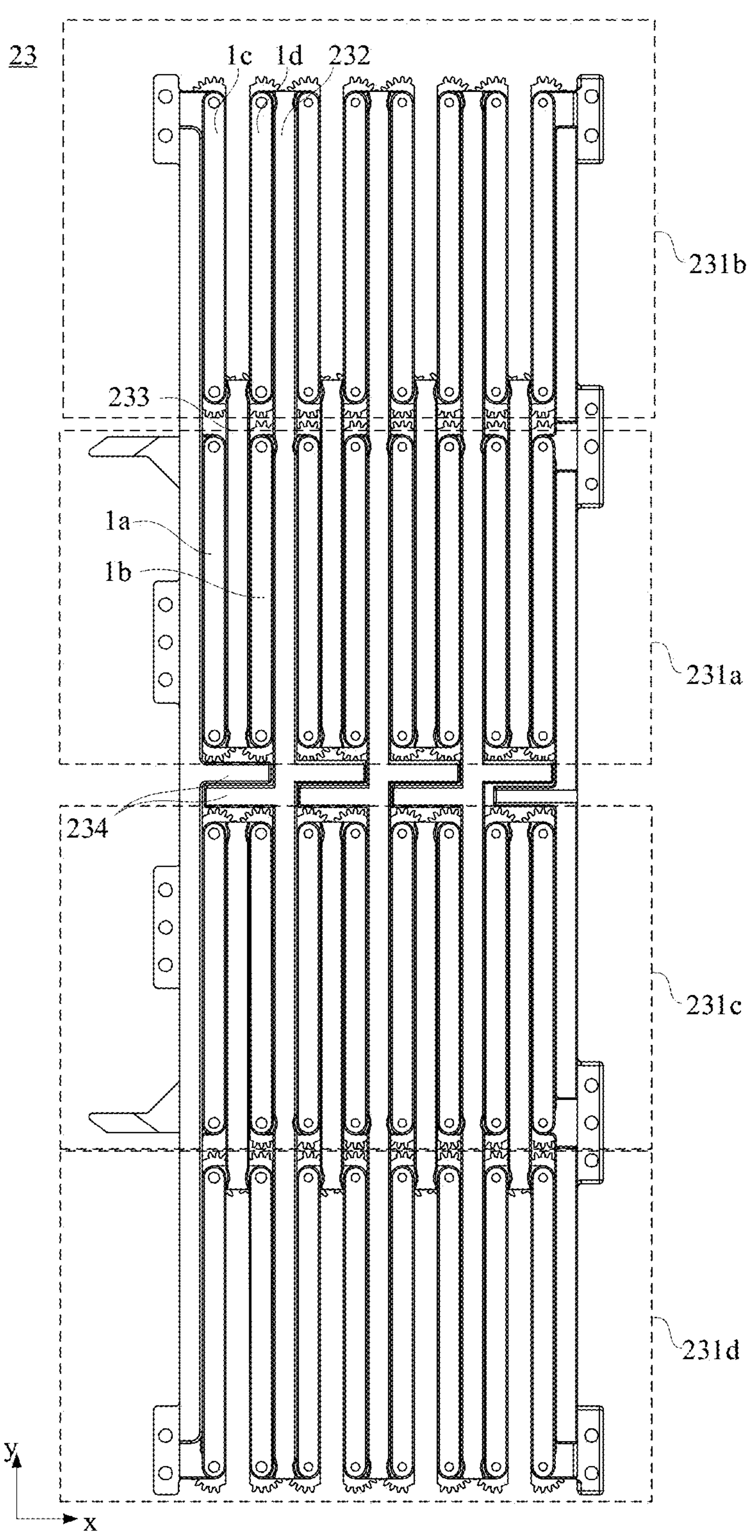
FIG. 6 is a structural schematic diagram of the folding telescopic frames, i.e., the structure shown in FIG. 5, when the telescopic assembly is in a contracted state.

FIG. 5 is a structural schematic diagram of folding telescopic frames when the telescopic assembly is in the extended state according to an embodiment of the present disclosure. FIG. 6 is a structural schematic diagram of the folding telescopic frames, i.e., the structure shown in FIG. 5, when the telescopic assembly is in a contracted state according to an embodiment of the present disclosure. In FIG. 5 and FIG. 6, in order from top to bottom, the four folding telescopic frames are a second folding telescopic frame 231*b*, a first folding telescopic frame 231*a*, a third folding telescopic frame 231*c* and a fourth folding telescopic frame 231*d* respectively.

The four folding telescopic frames include a first folding telescopic frame group and a second folding telescopic frame group. The first folding telescopic frame group and the second folding telescopic frame group are symmetrically disposed about a first centerline O of the telescopic assembly 23. The length direction of the first centerline O is identical with the telescoping direction x of the telescopic assembly 23. That is, the first folding telescopic frame 231*a* is a folding telescopic frame closest to the first centerline O in the first folding telescopic frame group, and the third folding telescopic frame 231*c* is a folding telescopic frame closest to the first centerline in the second folding telescopic frame group. The third folding telescopic frame 231*c* and the first folding telescopic frame 231*a* are symmetrically disposed about the first centerline O, and the fourth folding telescopic frame 231*d* and the second folding telescopic frame 231*b* are symmetrically disposed about the first centerline O.

Exemplarily, each folding telescopic frame 231 includes a plurality of folding units 2310 connected sequentially in the telescoping direction x and each folding unit 2310 is provided with a translation part 2310*a*. During telescoping of the folding telescopic frame 231, the distance between the translation part 2310*a* and the first centerline O of the telescopic assembly 23 does not change and the translation part 2310*a* only displaces in the telescoping direction x.

The balance connecting rod 232 is connected between one translation part 2310*a* of a first folding unit and one translation part 2310*a* of a second folding unit, and the first folding unit and the second folding unit belong to two adjacent folding telescopic frames 231 respectively and the first folding unit and the second folding unit are adjacent in the first direction y. Ideally, the distance between the translation parts 2310*a* of the two folding units adjacent in the first direction y will not change during telescoping of the folding telescopic frames 231. Therefore, the disposing the balance connecting rod 232 between the translation parts 2310*a* of the two adjacent folding units 2310 facilitates driving the two folding units 2310 connected to the balance connecting rod 232 to synchronously telescope.

In some examples, a folding unit 2310 of the first folding telescopic frame 231*a* is V-shaped and includes a first connecting rod 1*a* and a second connecting rod 1*b*. One end of the first connecting rod 1*a* and one end of the second connecting rod 1*b* are connected through a first connecting part, and the second connecting rod 1*b* is connected to one end of the first connecting rod 1*a* of another folding unit 2310 of the first folding telescopic frame 231*a* through a second connecting part.

The second folding telescopic frame 231*b* includes a third connecting rod 1*c* and a fourth connecting rod 1*d*. One end of the third connecting rod 1*c* and one end of the fourth connecting rod 1*d* are connected through a third connecting part, and the fourth connecting rod 1*d* is connected to one end of the third connecting rod 1*c* of another folding unit of the second folding telescopic frame 231*b* through a fourth connecting part. The third connecting rod 1*c* is parallel to the first connecting rod 1*a*, and the fourth connecting rod 1*d* is parallel to the second connecting rod 1*b*.

In some examples, the second folding telescopic frame 231*b* has the same structure as the first folding telescopic frame 231*a* and may be obtained by translation of the first folding telescopic frame 231*a*.

In conjunction with FIG. 5 and FIG. 6, when the various folding telescopic frames 231 are in the extended state, the distance from the second connecting part to the first centerline line O is h; and when the various folding telescopic frames 231 are in a folded state, the distance from the second connecting part to the first centerline line O is also h. It can be seen that the distance from the second connecting part to the first centerline line O does not change during telescoping of the telescopic assembly 23. Therefore, the second connecting part of the first folding telescopic frames 231*a* is the translation part of the first folding telescopic frames 231*a*. Similarly, the fourth connecting part of the second folding telescopic frame 231*b* is the translation part of the second folding telescopic frame 231*b*.

A folding unit 2310 of the third folding telescopic frame 231*c* is V-shaped and includes a first connecting rod 1*a* and a second connecting rod 1*b*. One end of the first connecting rod 1*a* and one end of the second connecting rod 1*b* are connected through a first connecting part, and the second connecting rod 1*b* is connected to one end of the first connecting rod 1*a* of another folding unit 2310 of the third folding telescopic frame 231*c* through a second connecting part.

The fourth folding telescopic frame 231*d* includes a third connecting rod 1*c* and a fourth connecting rod 1*d*. One end of the third connecting rod 1*c* and one end of the fourth connecting rod 1*d* are connected through a third connecting part, and the fourth connecting rod 1*d* is connected to one end of the third connecting rod 1*c* of another folding unit 2310 of the fourth folding telescopic frame 231*d* through a fourth connecting part. The third connecting rod 1*c* is parallel to the first connecting rod 1*a*, and the fourth connecting rod 1*d* is parallel to the second connecting rod 1*b*. The third folding telescopic frame 231*c* has the same structure as the fourth folding telescopic frame 231*d* and may be obtained by translation of the fourth folding telescopic frame 231*d*.

The second connecting part of the third folding telescopic frame 231*c* is the translation part of the third folding telescopic frame 231*c*. Similarly, the fourth connecting part of the fourth folding telescopic frame 231*d* is the translation part of the fourth folding telescopic frame 231*d*.

Figure 7:
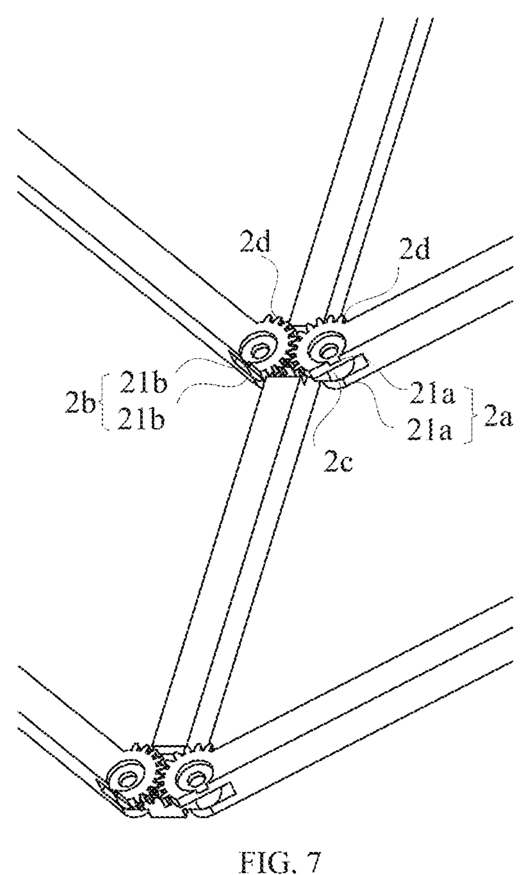
FIG. 7 is a structural schematic diagram of a connecting part according to an embodiment of the present disclosure.

FIG. 7 is a structural schematic diagram of a connecting part according to an embodiment of the present disclosure. As shown in FIG. 7, the connecting part includes a first connecting structure 2*a*, a second connecting structure 2*b* and a connecting plate 2*c*. The first connecting structure 2*a* and the second connecting structure 2*b* are fixedly connected to two adjacent connecting rods respectively in the corresponding folding telescopic frame 231 and are both hinged to the connecting plate 2*c*; and the first connecting structure 2*a* and the second connecting structure 2*b* are both perpendicular to the telescoping direction x and the first direction y relative to the rotation axis of the connecting plate 2*c*. That is, the rotation axis of the connecting plate 2*c* extends along a second direction z.

Exemplarily, the first connecting structure 2*a* includes two ear plates 21*a* and the two ear plates 21*a* are parallel to each other and disposed at an interval in the second direction z. The second connecting structure 2*b* also includes two ear plates 21*b* and the two ear plates 21*b* are parallel to each other and disposed at an interval in the second direction z. The two ear plates 21*a* of the first connecting structure 2*a* are connected to one end of one connecting rod. The two ear plates 21*b* of the second connecting structure 2*b* are connected to one end of another connecting rod. Exemplarily, the two ear plates 21*a* and the connecting rod connected thereto may be integrally formed and the two ear plates 21*b* and the connecting rod connected thereto may also be integrally formed. A part of the connecting plate 2*c* is disposed between the two ear plates 21*a* and the other part of the connecting plate 2*c* is disposed between the two ear plates 21*b*.

Each of the two ear plates 21*a* of the first connecting structure 2*a* and the two ear plates 21*b* of the second connecting structure 2*b* is provided with a shaft hole, and the connecting plate 2*c* is provided with a first shaft hole c1 (see FIG. 9) matching the first connecting structure 2*a* and a second shaft hole c2 (see FIG. 9) matching the second connecting structure 2*b*.

A first articulated shaft is disposed in the shaft holes 21*a* in the ear plates 21*a* of the first connecting structure 2*a* and the first shaft hole c1. The first articulated shaft is in interference fit with or fixedly connected to the shaft holes in the ear plates 21*a* so as to fixedly connect the ear plates 21*a* of the first connecting structure 2*a* and the first articulated shaft; and the articulated shaft is in clearance fit with the first shaft hole c1 in the connecting plate 2*c*, so that the first articulated shaft may rotate in the first shaft hole c1 of the connecting plate 2*c*. A second articulated shaft is disposed in the shaft holes in the ear plates 21*b* of the second connecting structure 2*b* and the second shaft hole c2. The second articulated shaft is in interference fit with or fixedly connected to the shaft holes in the ear plates 21*b* so as to fixedly connect the ear plates of the second connecting structure 2*b* and the second articulated shaft; and the second articulated shaft is in clearance fit with the second shaft hole c2 in the connecting plate 2*c*, so that the second articulated shaft may rotate in the second shaft hole c2 of the connecting plate 2*c*.

Exemplarily, an outer side wall of the ear plate of the first connecting structure 2*a* includes a first portion and a second portion which are connected in a circumferential direction. The first portion is planar and coplanar with a first side face of the connecting rod connected to the first connecting structure 2*a*. An outer side wall of the ear plate of the second connecting structure 2*b* also includes a first portion and a second portion which are connected in a circumferential direction. The first portion is planar and coplanar with a first side face of the connecting rod connected to the second connecting structure 2*b*. The first side faces of these two connecting rods are coplanar.

The second portion of the outer side wall of the ear plate of the first connecting structure 2*a* and the second portion of the outer side wall of the ear plate of the second connecting structure 2*b* both are arc surfaces and tangent to each other.

The outer side walls of the first connecting structure 2*a* and the second connecting structure 2*b* each have a toothed structure 2*d*, and the toothed structure 2*d* of the first connecting structure 2*a* and the toothed structure 2*d* of the second connecting structure 2*b* engage with each other. Since the toothed structure 2*d* of the first connecting structure 2*a* and the toothed structure 2*d* of the second connecting structure 2*b* engage with each other, during telescoping of the folding telescopic frame 231, the two connecting rods connected by the connecting part in FIG. 8 may be opened or closed synchronously. Thus, the symmetrical axis between the two connecting rods is always along the first direction x.

Exemplarily, the toothed structure 2*d* may be disposed on the second portions of the two ear plates 21*a* of the first connecting structure 2*a* or on the second portion 21*a* of any of the two ear plates 21*a* of the first connecting structure 2*a*. The toothed structure 2*d* of the second connecting structure 2*b* is disposed correspondingly to the toothed structure 2*d* of the first connecting structure 2*a*.

Figure 8:
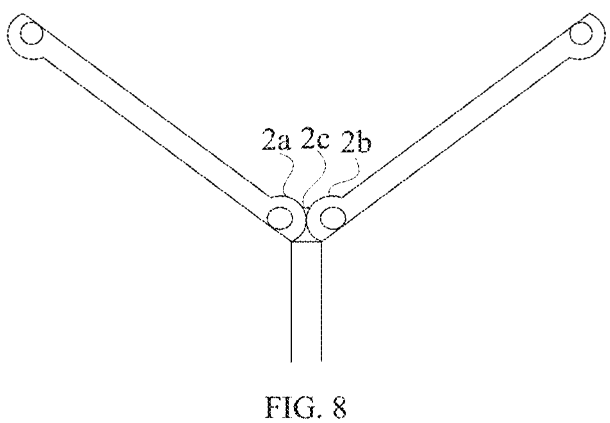
FIG. 8 is a structural schematic diagram of another connecting part according to an embodiment of the present disclosure.

FIG. 8 is a structural schematic diagram of another connecting part according to an embodiment of the present disclosure. As shown in FIG. 8, on the basis of the structure of the connecting part shown in FIG. 7, the toothed structures 2*d* are removed.

Optionally, in the structure shown in FIG. 7, the second articulated shaft may be in clearance fit or interference fit with the second shaft hole c2 in the connecting plate 2*c* as long as the second articulated shaft may rotate in the second shaft hole c2 of the connecting plate 2*c* under an action of an external force. When the second articulated shaft is in interference fit with the second shaft hole c2 in the connecting plate 2*c*, it can provide a stop damping for the telescopic assembly, thereby facilitating stepless adjustment of the size of the display region of the flexible display screen 10.

In some examples, each of the first connecting part, the second connecting part, the third connecting part and the fourth connecting part mentioned above may adopt the structure of the connecting part shown in FIG. 7 or the structure of the connecting part shown in FIG. 8.

In some other examples, a part of the first connecting part, the second connecting part, the third connecting part and the fourth connecting part mentioned above adopts the structure of the connecting part shown in FIG. 7 and the other adopts the structure of the connecting part shown in FIG. 8. For example, the first and second connecting parts adopt the structure of the connecting part shown in FIG. 8; and the third connecting part and the fourth connecting part adopt the structure of the connecting part shown in FIG. 7.

If all the connecting parts adopt the structure of the connecting part shown in FIG. 8, requirements on the assembly accuracy are high as it needs to ensure that corresponding toothed structures engage with each other. Therefore, the structure of the connecting part shown in FIG. 7 and the manner in which the connecting part shown in FIG. 8 are used in conjunction with each other may, on the one hand, reduce the assembly accuracy requirements, and, on the other hand, maintain the opening and closing synchronization of the connected connecting rods.

In the embodiments of the present disclosure, the second connecting part of the first folding telescopic frame 231_a_ and the second connecting part of the third folding telescopic frame 231_c_ are connected through one balance connecting rod 232. The second connecting part of the first folding telescopic frame 231_a_ and the fourth connecting part of the second folding telescopic frame 231_b_ are connected through one balance connecting rod 232. The second connecting part of the third folding telescopic frame 231_c_ and the fourth connecting fourth of the fourth folding telescopic frame 231_d_ are connected through one balance connecting rod 232.

Optionally, in this embodiment, the numbers of the balance connecting rods included in the various balance connecting rod groups may be the same. For example, the balance connecting rod group between the first folding telescopic frame 231_a_ and the second folding telescopic frame 231_b_, the balance connecting rod group between the third folding telescopic frame 231_c_ and the fourth folding telescopic frame 231_d_, and the balance connecting rod group between the first folding telescopic frame 231_a_ and the third folding telescopic frame 231_c_ each includes three balance connecting rods.

In this embodiment, in the telescoping direction x, for any folding telescopic frame 231, one or more folding units 2310 exist between a first balance connecting rod and a second balance connecting rod; and the first balance connecting rod and the second balance connecting rod are two adjacent balance connecting rods 232 in the telescoping direction x in the same balance connecting rod group. For example, in FIG. 5, one folding unit 2310 exists between the first balance connecting rod and the second balance connecting rod. For example again, in FIG. 10, in the direction from top to bottom, for the first and third balance connecting rod groups, one folding unit 2310 exists between the first balance connecting rod and the second balance connecting rod; and for the second balance connecting rod group, two folding units 2310 exist between the first balance connecting rod and the second balance connecting rod.

Optionally, a plurality of balance connecting rods 232 connected between all adjacent translation parts in the first direction y are integrally formed. For example, the balance connecting rod 232 between the second connecting part of the first folding telescopic frame 231_a_ and the second connecting part of the third folding telescopic frame 231_c_, the balance connecting rod 232 between the second connecting part of the first folding telescopic frame 231_a_ and the fourth connecting part of the second folding telescopic frame 231_b_, and the balance connecting rod 232 between the second connecting part of the third folding telescopic frame 231_c_ and the fourth connecting part of the fourth folding telescopic frame 231_d_ are integrally formed.

The balance connecting rods integrally formed can, on the one hand, connect together all the folding telescopic frames in series, which is conductive to further improving the telescoping synchronization of the various folding telescopic frames; and on the other hand, reduce the assembly difficulty of the telescopic mechanism, which improves the assembly efficiency.

Figure 9:
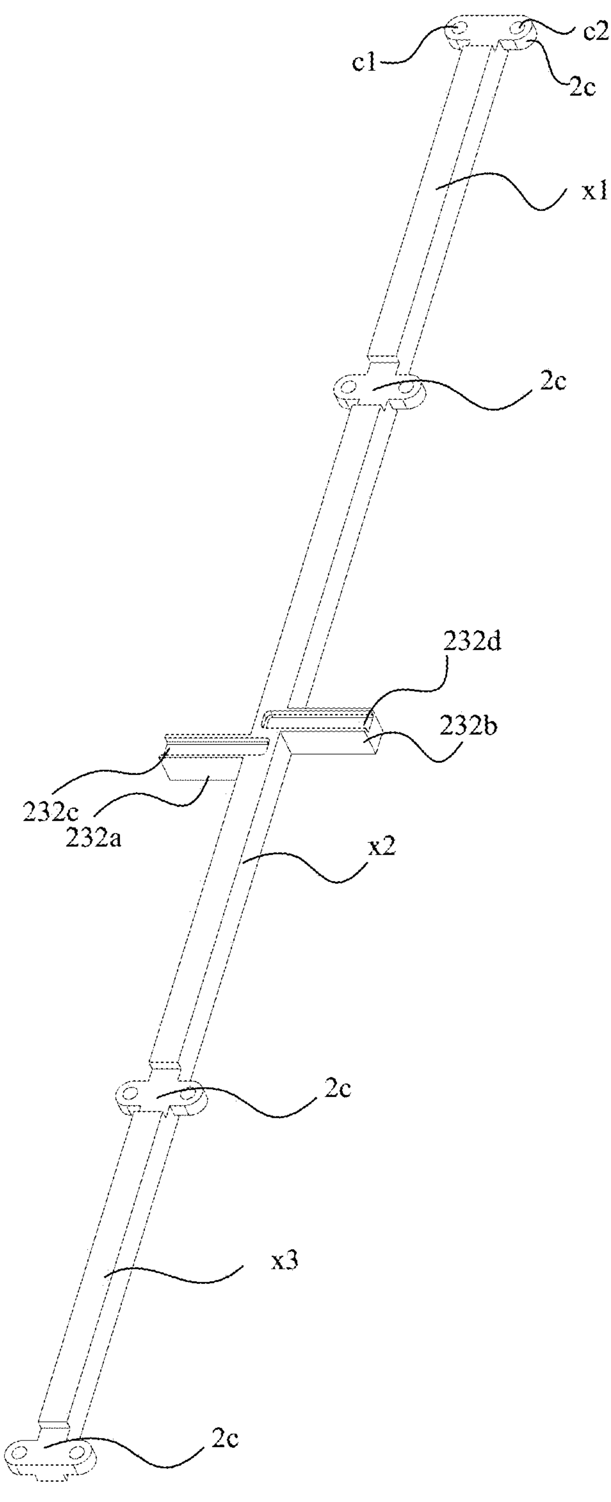
FIG. 9 is a structural schematic diagram of a balance connecting rod according to an embodiment of the present disclosure.

FIG. 9 is a structural schematic diagram of a balance connecting rod according to an embodiment of the present disclosure. As shown in FIG. 9, the balance connecting rod 232 includes three sections. A first section x1 is disposed between the fourth connecting part of the second folding telescopic frame 231_b_ and the second connecting part of the first folding telescopic frame 231_a_, a second section x2 is disposed between the second connecting part of the first folding telescopic frame 231_a_ and the second connecting part of the third folding telescopic frame 231_c_, and a third section x3 is disposed between the second connecting part of the third folding telescopic frame 231_c_ and the fourth connecting part of the fourth folding telescopic frame 231_d_.

Exemplarily, connecting plates of all the connecting parts disposed sequentially in the x direction and the balance connecting rod 232 are integrally formed. In this way, the number of parts in the telescopic mechanism can be reduced, thereby reducing the assembly difficulty.

In the embodiments of the present disclosure, side faces of the various connecting parts and the various connecting rods (including the first to fourth connecting rods, the balance connecting rods and synchronically-moved connecting rods) facing the flexible display screen are flush with one another to provide better support for the flexible display screen.

It should be noted that in FIG. 4 to FIG. 6, an illustration is given by taking that the telescopic assembly 23 includes four folding telescopic frames 231 as an example. In practical application, the number of the folding telescopic frames 231 may be set according to actual needs. For example, it can be 6, 8 and the like. Accordingly, the number of folding telescopic frames 231 included in each folding telescopic frame group may be 3, 4 or the like.

In the embodiments of the present disclosure, as shown in FIG. 5 and FIG. 6, the telescopic assembly 23 further includes at least one magnet 234, and a middle part of at least one balance connecting rod 232 is connected to the at least one magnet 234. The magnet 234 may absorb the support member 12 of the flexible display screen 10 to avoid arching of the flexible display screen 10 and improve the flatness of the flexible display screen 10, thereby improving the display effect.

In the embodiments of the present disclosure, a middle part of each balance connecting rod 232 intersected with the first centerline is connected to a magnet 234. In other embodiments, a part of middle parts of a plurality of balance connecting rods 232 intersected with the first centerline O are connected to magnets 234.

Optionally, middle parts of balance connecting rods 232 which are not intersected with the first centerline O (i.e., balance connecting rods 232 disposed at two sides of the first centerline O) may be connected to or not connected to magnets 234.

Optionally, as shown in FIG. 9, the telescopic assembly 23 further includes a first connecting rod 232_a_ and a second connecting rod 232_b_. One end of the first connecting rod 232_a_ and one end of the second connecting rod 232_b_ are both connected to the middle part of the balance connecting rod 232, and the first connecting rod 232_a_ and the second connecting rod 232_b_ are disposed on two sides of the balance connecting rod 232 respectively in the telescoping direction. For example, the first connecting rod 232_a_ is disposed on the left side of the corresponding balance connecting rod 232, the second connecting rod 232_b_ is disposed on the right side of the corresponding balance connecting rod 232, and the length directions of the both the first connecting rod 232_a_ and the second connecting rod 232_b_ are identical with the telescoping direction x. The first connecting rod 232_a_ and the second connecting rod 232_b_ are disposed at an interval in the first direction y. For example, as shown in FIG. 4 and FIG. 5, in the direction x, the first connecting rod 232_a_ is disposed below the second connecting rod 232_b_. Exemplarily, as shown in FIG. 4 and FIG. 5, the first connecting rod 232*a* is disposed below the first centerline O and the second connecting rod 232*b* is disposed above the first centerline O.

In the embodiments of the present disclosure, the first connecting rod 232*a* is connected to a first magnet and the second connecting rod 232*b* is connected to a second magnet.

As the first connecting rod 232*a* and the second connecting rod 232*b* are disposed at an interval in the first direction y, when the m folding telescopic frames are in the folded state, the first connecting rod and the second connecting rod are staggered, which does not affect the folding function of the folding telescopic frames. When the m folding telescopic frames are in the extended state, as the first connecting rod 232*a* and the second connecting rod 232*b* are disposed on two sides of the balance connecting rod 232 respectively in the telescoping direction, the flexible display screen may be adsorbed on two sides of the balance connecting rod 232 at the same, which increases the cover length of the magnets in the telescoping direction x, and is conductive to improving the flatness of the flexible display screen.

In other embodiments, the telescopic assembly 23 may only include one of the first connecting rod 232*a* and the second connecting rod 232*b*.

Optionally, the surface of the first connecting rod 232*a* closer to the flexible display screen is provided with a first mounting groove 232*c*, and the first magnet is disposed in the first mounting groove 232*c*. The surface of the second connecting rod 232*b* closer to the flexible display screen is provided with a second mounting groove 232*d*, and the second magnet is disposed in the second mounting groove 232*d*. The first magnet and the second magnet are disposed in corresponding mounting grooves, thereby facilitating mounting.

During implementation, the surface of the first magnet is flush with the surface of the first connecting rod, and the surface of the second magnet is flush with the surface of the second connecting rod. In this way, the entire surface of the telescopic assembly is flat.

Optionally, with reference to FIG. 5 and FIG. 6 again, the telescopic assembly further includes a plurality of synchronously-moved connecting rods 233. The plurality of synchronously-moved connecting rods 233 are connected between the first connecting parts of the first folding telescopic frame 231*a* and the third connecting parts of second folding telescopic frame 231*b*. During telescoping of the telescopic assembly 23, the first connecting part and the third connecting part displace in the telescoping direction and the first direction, but the distance between the first connecting part and the third connecting part does not change. Therefore, the synchronously-moved connecting rod may be disposed between the first connecting part and the third connecting part, which does not affect the telescoping action of the telescopic assembly and meanwhile can improve the movement synchronization of the first connecting part and the third connecting part.

Figure 10:
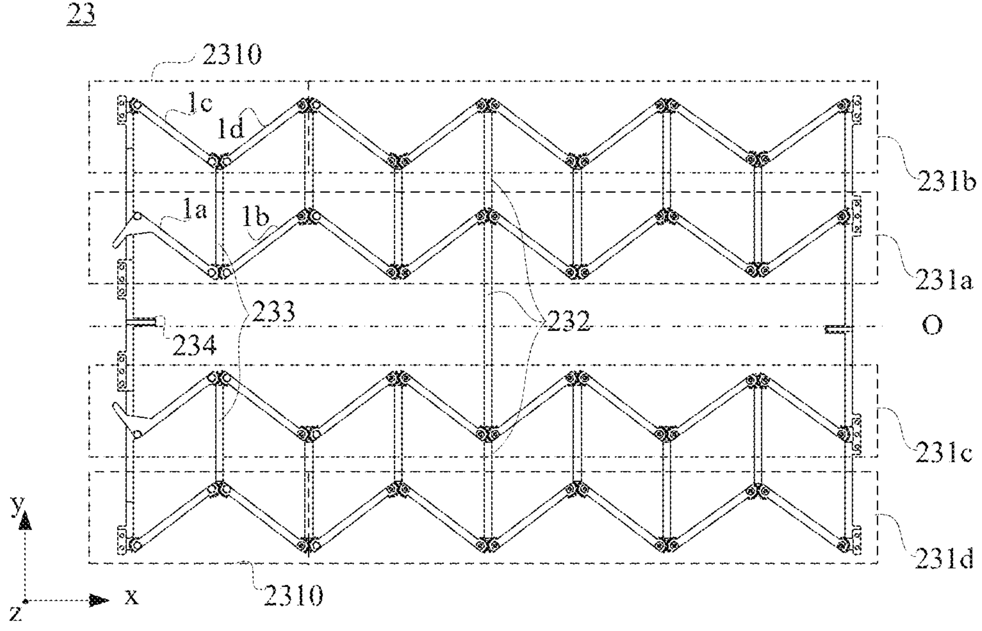
FIG. 10 is a structural schematic diagram of another telescopic assembly according to an embodiment of the present disclosure.

FIG. 10 is a structural schematic diagram of another telescopic assembly according to an embodiment of the present disclosure. This telescopic assembly differs from that shown in FIG. 5 in that the balance connecting rods 232 are disposed in a different way. As shown in FIG. 10, different balance connecting rod groups include different numbers of balance connecting rods 232.

For example, the balance connecting rod group between the first folding telescopic frame 231*a* and the second folding telescopic frame 231*b* includes three balance connecting rods, the balance connecting rod group between the third folding telescopic frame 231*c* and the fourth folding telescopic frame 231*d* includes three balance connecting rods, and the balance connecting rod group between the first folding telescopic frame 231*a* and the third folding telescopic frame 231*c* includes one balance connecting rod.

The number of the balance connecting rods included in each balance connecting rod group may be set according to actual needs as long as the telescoping synchronization of the various folding telescopic frames can be improved and the flexible display screen can be stably supported.

Figure 11:
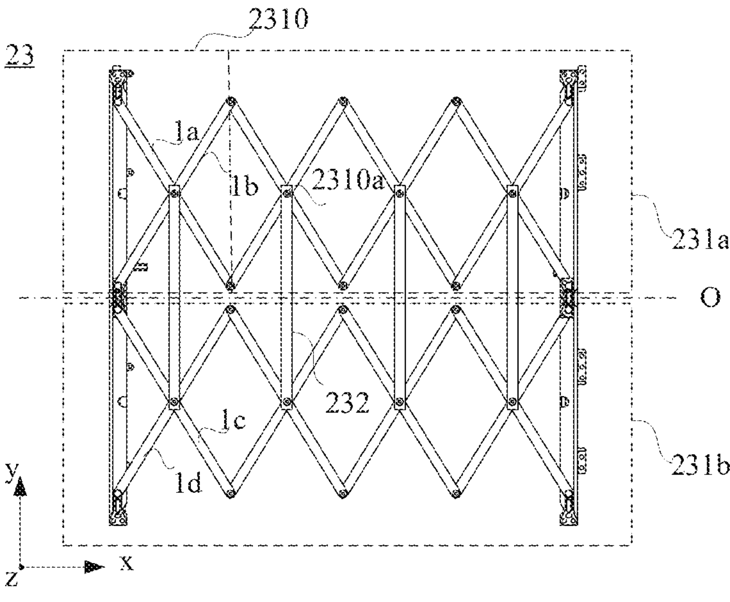
FIG. 11 is a structural schematic diagram of still another telescopic assembly according to an embodiment of the present disclosure.

FIG. 11 is a structural schematic diagram of still another telescopic assembly according to an embodiment of the present disclosure. As shown in FIG. 11, the telescopic assembly 23 includes a first telescopic frame group and a second telescopic frame group. The first telescopic frame group and the second telescopic frame group are symmetrically disposed about a first centerline O.

The first telescopic frame group includes a first folding telescopic frame 231*a*. The first folding telescopic frame 231*a* includes a plurality of folding units 2310 connected sequentially in the telescoping direction x and each folding unit 2310 is X-shaped and includes a first connecting 1*a* and a second connecting rod 1*b*. A middle part of the first connecting rod 1*a* is hinged to a middle part of the second connecting rod 1*b*, and one end of the first connecting rod 1*a* is hinged to one end of the second connecting rod 1*b* of another folding unit 2310 of the first folding telescopic frame 231*a*.

The second telescopic frame group includes a second folding telescopic frame 231*b*. The second folding telescopic frame 231*b* has the same structure as the first folding telescopic frame 231*a*. A folding unit 2310 of the second folding telescopic frame 231*b* includes a first connecting 1*c* and a second connecting rod 1*d*. A middle part of the first connecting rod 1*c* is hinged to a middle part of the second connecting rod 1*d*, and one end of the first connecting rod 1*c* is hinged to one end of the second connecting rod 1*d* of another folding unit 2310 of the second folding telescopic frame 231*b*.

Parts where the middle parts of the first connecting rods 1*a* are hinged to the middle parts of second connecting rods 1*b* respectively are translation parts of the first folding telescopic frame 231*a* and the second folding telescopic frame 231*b*.

In FIG. 11, the telescopic assembly 23 includes one balance connecting rod group, and the balance connecting rod group is disposed between the first folding telescopic frame 231*a* and the second folding telescopic frame 231*b* and includes a plurality of balance connecting rods 232.

Exemplarily, the number of the balance connecting rods 232 included in the balance connecting rod group is equal to the number of the folding units 2310 in the first folding telescopic frame 231*a*.

Figure 12:
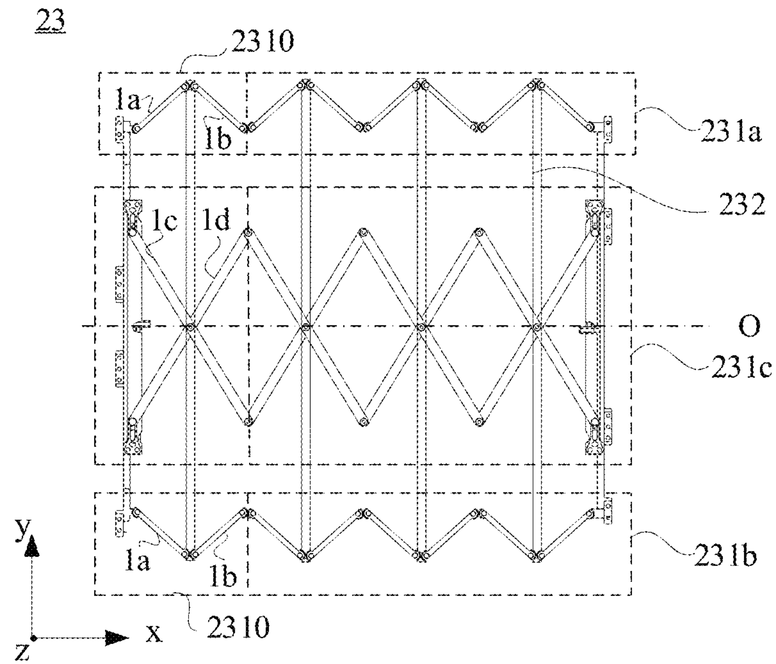
FIG. 12 is a structural schematic diagram of yet still another telescopic assembly according to an embodiment of the present disclosure.

FIG. 12 is a structural schematic diagram of yet still another telescopic assembly according to an embodiment of the present disclosure. As shown in FIG. 12, the telescopic assembly 23 includes a first telescopic frame group, a second telescopic frame group and a third telescopic frame group. The first telescopic frame group and the second telescopic frame group are symmetrically disposed about a first centerline O.

The first telescopic frame group includes a first folding telescopic frame 231*a*. A folding unit 2310 of the first folding telescopic frame 231*a* is V-shaped and includes a first connecting 1*a* and a second connecting rod 1*b*. One end of the first connecting rod 1*a* and one end of the second connecting rod 1*b* are connected through a first connecting part, and the second connecting rod 1*b* is connected to one end of the first connecting rod 1*a* of another folding unit 2310 of the first folding telescopic frame 231*a* through a second connecting part.

The second telescopic frame group includes a second folding telescopic frame 231*b*. The second folding telescopic frame 231*b* and the first folding telescopic frame 231*a* are symmetrically disposed about the first centerline O.

The third telescopic frame group includes a third folding telescopic frame 231*c*. Any folding unit 2310 of the third folding telescopic frame 231*c* is X-shaped and includes a third connecting rod 1*c* and a fourth connecting rod 1*d*. A middle part of the third connecting rod 1*c* is hinged to a middle part of the fourth connecting rod 1*d*, and one end of the third connecting rod 1*c* is hinged to one end of the fourth connecting rod 1*d* of another folding unit 2310 of the third folding telescopic frame 231*c*.

A first connecting part is a translation part of the first folding telescopic frames 231*a*. A part where the middle part of the third connecting rod 1*c* is hinged to the middle part of the fourth connecting rod 1*d* is a translation part of the third folding telescopic frame 231*c*.

In FIG. 12, the telescopic assembly 23 includes two balance connecting rod groups. One balance connecting rod group is disposed between the first folding telescopic frame 231*a* and the third folding telescopic frame 231*c* and the other balance connecting rod group is disposed between the second folding telescopic frame 231*b* and the third folding telescopic frame 231*c*.

Exemplarily, the two balance connecting rod groups include the same number of balance connecting rods 232, and for example, each include four balance connecting rods 232.

With reference to FIG. 4 again, in the embodiments of the present disclosure, the telescopic mechanism 20 further includes two telescopic slide rails 24. The two telescopic slide rails 24 are disposed at two sides of the m folding telescopic frames 231 in the first direction y, that is, disposed at two sides of the telescopic assembly 23. Two ends of the telescopic slide rail 24 are connected to the fixed part 21 and the movable part 22 respectively.

The telescopic slide rail 24 includes a plurality of guide rails which are connected sequentially in a sliding manner. In the embodiments of the present disclosure, the plurality of guide rails includes a first fixed guide rail 241, a second fixed guide rail 242 and at least one intermediate guide rail 243. The at least one intermediate guide rail 243 is connected sequentially between the first fixed guide rail 241 and the second fixed guide rail 242. The first fixed guide rail 241 is connected to the fixed part 21 and the second fixed guide rail 242 is connected to the movable part 22. In the embodiments of the present disclosure, the number of the intermediate guide rails 243 is not limited and may be set according to the size and a storage ratio of the display device.

Figure 13:
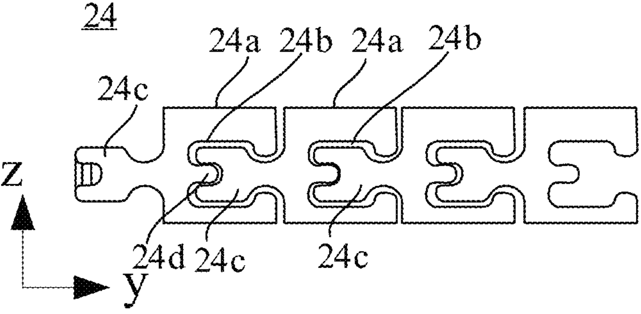
FIG. 13 is a sectional structural schematic diagram of a telescopic slide rail according to an embodiment of the present disclosure.

FIG. 13 is a sectional structural schematic diagram of a telescopic slide rail according to an embodiment of the present disclosure. As shown in FIG. 13, each guide rail includes a guide rail body 24*a* provided with a sliding groove 24*b*.

Figure 14:
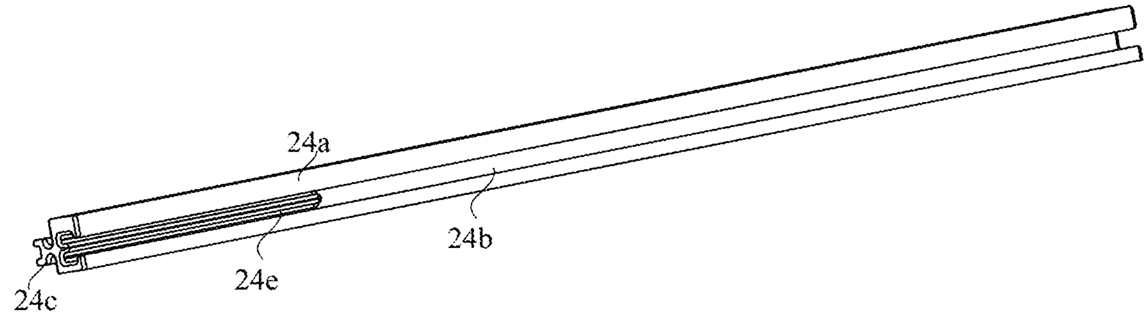
FIG. 14 is a stereoscopic structural schematic diagram of one guide rail from one angle according to an embodiment of the present disclosure.
Figure 15:
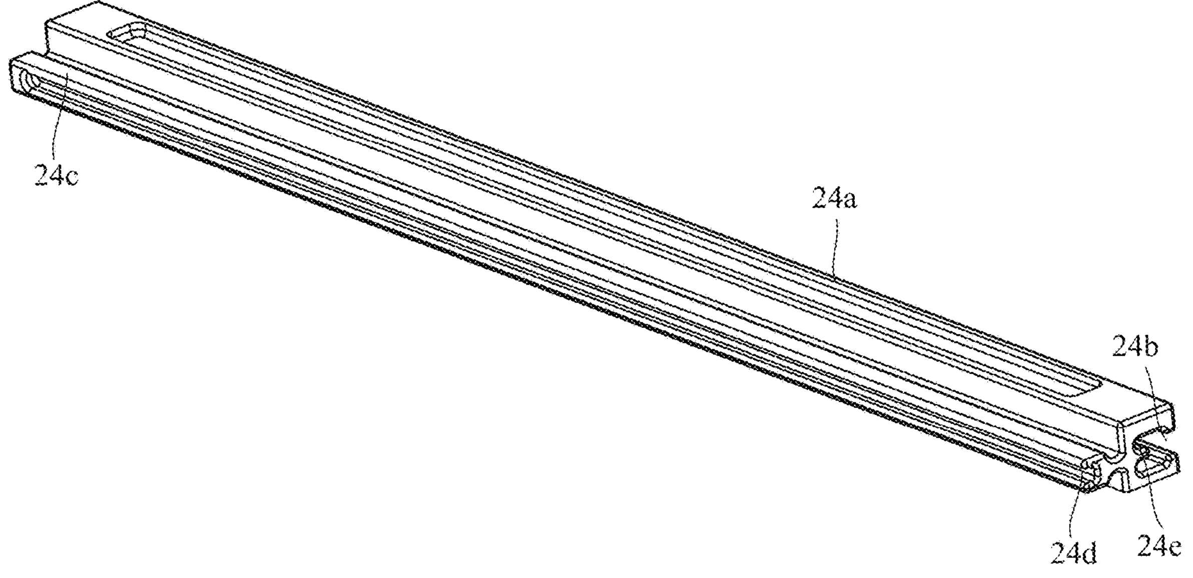
FIG. 15 is a stereoscopic structural schematic diagram of the guide rail in FIG. 14 from another angle.

FIG. 14 and FIG. 15 are stereoscopic structural schematic diagrams of one guide rail from different angles according to embodiments of the present disclosure. As shown in FIGS. 14 and 15, the sliding groove 24*b* extends from one end of the guide rail body 24*a* to the other end of the guide rail body 24*a*. In the embodiments of the present disclosure, the sliding groove 24*b* of each guide rail is formed in a surface, opposite to the telescopic assembly 23, of this guide rail. This facilitates decreasing the size of the telescopic slide rails in the second direction z and the second direction z is perpendicular to the telescoping direction x and the first direction y. In addition, this facilitates increasing the size of the telescopic slide rails in the first direction y and improving the support strength of the telescopic slide rail.

In addition to the guide rail body 24*a*, the intermediate guide rail 243 and the second fixed guide rail 242 each further include a limiting part 24*c*, and the limiting part 24*c* and the sliding groove 24*b* are disposed on two opposite sides of the guide rail body 24*a*.

Assuming that the first guide rail and the second guide rail are two connected guide rails, the limiting part 24*c* of the first guide rail is disposed in the sliding groove 24*b* of the second guide rail. In this way, the limiting part 24*c* of the first guide rail matches the sliding groove 24*b* of the second guide rail to achieve relative movement of the first and second guide rails in the telescoping direction y, thereby achieving the telescoping function of the sliding guide rails.

In the embodiments of the present disclosure, the maximum size of the limiting part 24*c* of the first guide rail in the second direction z is a first size L1, the size of an opening of the sliding groove 24*b* of the second guide rail in the second direction z is a second size L2, and the first size L1 is greater than the second size L2. In this way, it is difficult for the limiting part 24*c* of the first guide rail to detach from the sliding groove 24*b* of the second guide rail, thereby improving the reliability of the telescopic slide rails during telescoping.

Figure 16:
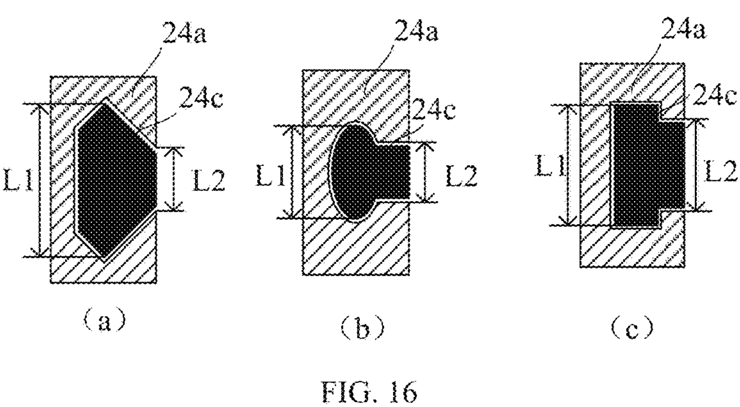
FIG. 16 is a sectional structural schematic diagram of a guide rail body of one guide rail and a limiting part of another guide rail according to an embodiment of the present disclosure.

Optionally, a section of the sliding groove 24*b* may be diamond-shaped (as shown in part (a) of FIG. 16), water-droplet-shaped (as shown in part (b) of FIG. 16), or T-shaped (as shown in part (c) of FIG. 16), or the like.

Optionally, in some examples, a first side face of the limiting part 24*c* is provided with a clamping groove 24*d*, the first side face is a side face of the limiting part 24*c* further away from the corresponding guide rail body, and the clamping groove 24*d* extends from one end of the limiting part to the other end of the limiting part 24*c*. The groove bottom of the sliding groove 24*b* is provided with a raised structure 24*e*, which is disposed at one end of the sliding groove 24*b* closer to the first fixed guide rail 241. The raised structure 24*e* is disposed in the clamping groove 24*d*, so that the limiting part 24*c* is fully opened, thereby further preventing the limiting part from detaching from the sliding groove. As the limiting part is provided with the clamping groove 24*d*, during assembly of the first and second guide rails, the cross-sectional area of the limiting part of the first guide rail is reduced after being squeezed, making it easy to enter the sliding groove of the second guide rail. This can improve the assembly efficiency of the sliding guide rails.

Exemplarily, the raised structure 24*e* is a raised strip and the length direction of the raised strip is identical with the extending direction of the sliding groove 24*b*. Optionally, the bottom surface of the raised strip is connected to the groove bottom of the sliding groove, and the top surface of the raised strip is arch-shaped so as to facilitate extension into the clamping groove 24*d*.

Figure 17:
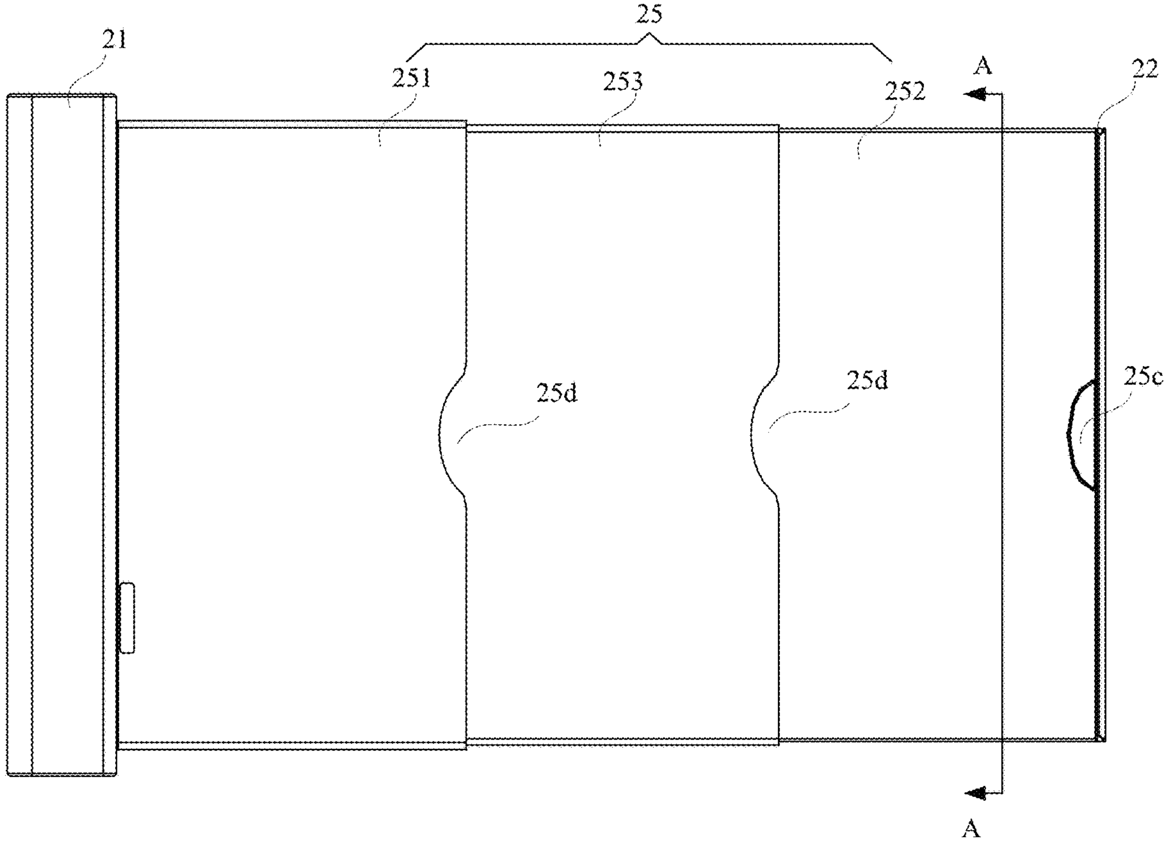
FIG. 17 is a structural schematic diagram of a rear housing in an extended state according to embodiment of the present disclosure.

Optionally, in conjunction with FIG. 4 and FIG. 17, the telescopic mechanism 23 also includes a rear housing 25, and the telescopic assembly 23 and the telescopic slide rail 24 are disposed in the rear housing 25.

The rear housing 25 includes a plurality of sub-housings, including a first fixed sub-housing 251, a second fixed sub-housing 252, and an intermediate sub-housing 253. The first fixed sub-housing 251 is connected to the fixed part 21, and the second fixed sub-housing 252 is connected to the movable part 22. The intermediate sub-housing 253 is connected between the first fixed sub-housing 251 and the second fixed sub-housing 252.

In the embodiments of the present disclosure, the number of the intermediate sub-housings is not limited and may be set according to the size and a storage ratio of the display device. For example, it may be 1, 2, 3, or the like.

Figure 18:
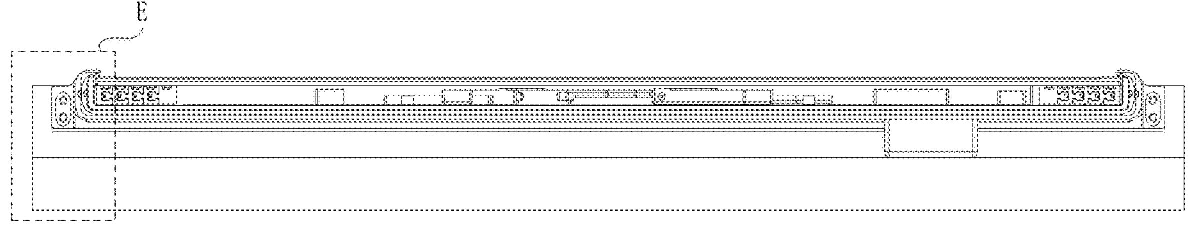
FIG. 18 is a sectional structural schematic diagram of the rear housing along line A-A in FIG. 17.
Figure 19:
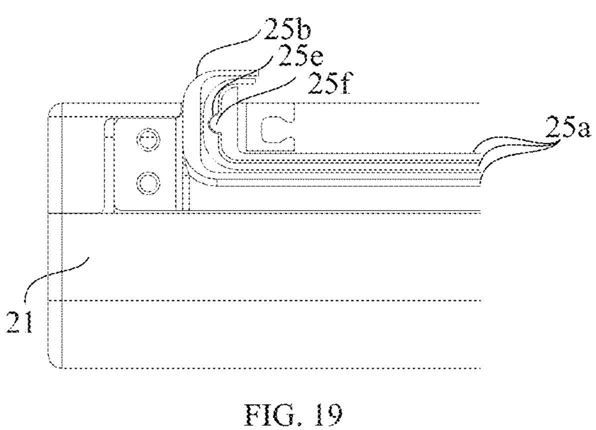
FIG. 19. is an enlarged structural schematic diagram of portion E in FIG. 18.

FIG. 18 is a sectional structural schematic diagram of the rear housing along line A-A in FIG. 17; and FIG. 19 is an enlarged structural schematic diagram of portion E in FIG. 18. In conjunction with FIGS. 18 and 19, in the embodiments of the present disclosure, each sub-housing includes a bottom plate 25*a* and two side plates 25*b* which are connected to two opposite sides of the bottom plate 25*a* respectively. It should be noted that only one side plate 25*b* is shown in FIG. 19. In this way, the bottom plate 25*a* and the two side plates 25*b* of the sub-housing define an accommodating space for placement of the telescopic assembly 23 and the telescopic slide rail 24.

An inner wall of the first side plate of the first sub-housing is provided with a first guide structure 25*e*, and an outer wall of the first side plate of the second sub-housing is provided with a second guide structure 25*f*. The inner wall and outer wall are at least partially opposite, and the first guide structure 25*e* matches the second guide structure 25*f*. The first sub-housing and the second sub-housing are two sub-housings 251 which are connected.

Optionally, the first guide structure 25*e* is a guide groove, and the length direction of the guide groove is identical with the telescoping direction x. The second guide structure 25*f* is a guide protrusion which is disposed in the guiding groove.

The bottom surface of the bottom plate 25*a* of the second fixed sub-housing 252 is provided with a bump 25*c*, and the bottom surface is a surface of the bottom plate 25*a* further away from the flexible display screen. The bump 25*c* may serve as a handle, which facilitates a user to pull the rear housing open, thereby driving the telescopic assembly and the telescopic slide rail to telescope. A side edge of the bottom plate 25*a* of each of the other sub-housings except the second fixed sub-housing 252 among the plurality of sub-housings is provided with a make-way port 25*d* matching the bump 25*c*. When the rear housing is in a contracted state, the bump 25*c* is disposed in the make-way port 25*d*, thereby not affecting the telescoping action of the telescopic mechanism.

In the embodiments of the present disclosure, the shape of the bump 25*c* is not limited. For example, the bump 25*c* may be arc-shaped, semi-cylindrical, or the like.

Embodiments of the present disclosure further provide a telescopic mechanism. The telescopic mechanism includes a fixed part, a movable part and a telescopic assembly. The fixed part and the movable part are used to be connected to two opposite side edges of a flexible display screen, respectively.

The telescopic assembly includes m folding telescopic frames and m is an integer greater than 1. Two ends of the folding telescopic frame are connected to the fixed part and the movable part respectively, the m folding telescopic frames are disposed at intervals in a first direction, and the first direction is perpendicular to a telescoping direction of the telescopic assembly. The folding telescopic frame includes a plurality of folding units connected sequentially in the telescoping direction of the telescopic assembly. The m folding telescopic frames include at least two first folding telescopic frames. A folding unit of the first folding telescopic frame is V-shaped and includes a first connecting and a second connecting rod. One end of the first connecting rod and one end of the second connecting rod are connected through a first connecting part, and the second connecting rod is connected to one end of the first connecting rod of another folding unit of the first folding telescopic frame through a second connecting part.

With the same telescoping distance and with a fixed length of a single connecting rod, the folding telescopic frame needs to include a relatively small number of connecting rods, which is conductive to reducing the weight of the display device.

Exemplarily, the folding telescopic frames include a first telescopic frame group and a second telescopic frame group. The first telescopic frame group and the second telescopic frame group are symmetrically disposed about a first centerline of the telescopic assembly.

In some possible embodiments, the first telescopic frame group includes at least two first folding telescopic frames. The related content refers to related content of the embodiments shown in FIG. 4 to FIG. 6 or FIG. 10, and is not described in detail here.

In other possible embodiments, the first telescopic frame group includes at least one first folding telescopic frame and at least one second folding telescopic frame. The related content refers to related content of the embodiment shown in FIG. 12 and is not described in detail here.

The above descriptions are only alternative embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A telescopic mechanism, comprising a fixed part, a movable part and a telescopic assembly, wherein the fixed part and the movable part are configured to be connected to two opposite side edges of a flexible display screen, respectively;

the telescopic assembly comprises m folding telescopic frames and m−1 balance connecting rod groups, where m is an integer and greater than 1;

two ends of the folding telescopic frame are connected to the fixed part and the movable part respectively, the m folding telescopic frames are disposed at intervals in a first direction, and the first direction is perpendicular to a telescoping direction of the telescopic assembly; and each of the balance connecting rod groups is disposed between two adjacent folding telescopic frames among the m folding telescopic frames, each of the balance connecting rod groups comprises at least one balance connecting rod, two ends of each balance connecting rod are connected to the two adjacent folding telescopic frames respectively, and a length direction of the balance connecting rod is identical with the first direction; and the telescopic mechanism further comprising a rear housing, and the telescopic assembly is disposed in the rear housing;

the rear housing comprises a plurality of sub-housings, and the sub-housing comprises a bottom plate and two side plates which are connected to two opposite sides of the bottom plate respectively; and the plurality of sub-housings comprises a first fixed sub-housing, a second fixed sub-housing, and at least one intermediate sub-housing, the first fixed sub-housing is connected to the fixed part, the second fixed sub-housing is connected to the movable part, and the at least one intermediate sub-housing is connected sequentially between the first fixed sub-housing and the second fixed sub-housing.

2. The telescopic mechanism according to claim 1, wherein the folding telescopic frame comprises a plurality of folding units connected sequentially along the telescoping direction, each of the folding units is provided with a translation part, and during telescoping of the folding telescopic frame, a distance between the translation part and a first centerline of the telescopic assembly does not change and a length direction of the first centerline is identical with the telescoping direction; and the balance connecting rod is connected between one translation part of a first folding unit and one translation part of a second folding unit, and the first folding unit and the second folding unit are two adjacent folding units in the first direction.

3. The telescopic mechanism according to claim 2, wherein the m folding telescopic frames comprise a first telescopic frame group and a second telescopic frame group, and the first telescopic frame group and the second telescopic frame group are symmetrically disposed about the first centerline;

the first telescopic frame group comprises a first folding telescopic frame and a second folding telescopic frame;

a folding unit of the first folding telescopic frame is V-shaped and comprises a first connecting rod and a second connecting rod, wherein one end of the first connecting rod and one end of the second connecting rod are connected through a first connecting part, and the second connecting rod is connected to one end of a first connecting rod of another folding unit of the first folding telescopic frame through a second connecting part;

the second folding telescopic frame comprises a third connecting rod and a fourth connecting rod, wherein one end of the third connecting rod and one end of the fourth connecting rod are connected through a third connecting part, the third connecting rod is parallel to the first connecting rod, the fourth connecting rod is parallel to the second connecting rod, the fourth connecting rod is connected to one end of a third connecting rod of another folding unit of the second folding telescopic frame through a fourth connecting part; and the second connecting part is the translation part of the first folding telescopic frame, and the fourth connecting part is the translation part of the second folding telescopic frame.

4. The telescopic mechanism according to claim 3, wherein the telescopic assembly further comprises at least one synchronously-moved connecting rod connected between the first connecting part of the first folding telescopic frame and the third connecting part of the second folding telescopic frame.

5. The telescopic mechanism according to claim 3, wherein any of the first connecting part, the second connecting part, the third connecting part and the fourth connecting part comprises a first connecting structure, a second connecting structure and a connecting plate;

the first connecting structure and the second connecting structure are fixedly connected to two adjacent connecting rods respectively in a corresponding folding telescopic frame, and the first connecting structure and the second connecting structure are both hinged to the connecting plate, and are perpendicular to the telescoping direction and the first direction relative to a rotation axis of the connecting plate.

6. The telescopic mechanism according to claim 5, wherein in at least one of the first connecting part, the second connecting part, the third connecting part and the fourth connecting part, each of outer side walls of the first connecting structure and the second connecting structure has a toothed structure, and the toothed structure of the first connecting structure and the toothed structure of the second connecting structure engage with each other.

7. The telescopic mechanism according to claim 2, wherein the m folding telescopic frames comprise a first telescopic frame group and a second telescopic frame group, and the first telescopic frame group and the second telescopic frame group are symmetrically disposed about the first centerline;

the first telescopic frame group comprises a first folding telescopic frame, a folding unit of the first folding telescopic frame comprises a first connecting rod and a second connecting rod, a middle part of the first connecting rod is hinged to a middle part of the second connecting rod, and one end of the first connecting rod is hinged to one end of a second connecting rod of another folding unit of the first folding telescopic frame; and a part where the middle part of the first connecting rod is hinged to the middle part of second connecting rod is the translation part of the first folding telescopic frame.

8. The telescopic mechanism according to claim 2, wherein the m folding telescopic frames comprise a first telescopic frame group, a second telescopic frame group and a third telescopic frame group, and the first telescopic frame group and the second telescopic frame group are symmetrically disposed about the first centerline;

the first telescopic frame group comprises a first folding telescopic frame, a folding unit of the first folding telescopic frame comprises a first connecting rod and a second connecting rod; one end of the first connecting rod and one end of the second connecting rod are connected through a first connecting part, and the second connecting rod is connected to one end of a first connecting rod of another folding unit of the first folding telescopic frame through a second connecting part;

the third telescopic frame group comprises a third folding telescopic frame; any folding unit of the third folding telescopic frame comprises a third connecting rod and a fourth connecting rod; a middle part of the third connecting rod is hinged to a middle part of the fourth connecting rod, and one end of the third connecting rod is hinged to one end of a fourth connecting rod of another folding unit of the third folding telescopic frame; and the first connecting part is the translation part of the first folding telescopic frame, and a part where the middle part of the third connecting rod is hinged to the middle part of the fourth connecting rod is the translation part of the third folding telescopic frame.

9. The telescopic mechanism according to claim 2, wherein in the telescoping direction, for any folding telescopic frame, one or more folding units exist between a first balance connecting rod and a second balance connecting rod, and the first balance connecting rod and the second balance connecting rod are two adjacent balance connecting rods in the telescoping direction in the same balance connecting rod group.

10. The telescopic mechanism according to claim 9, wherein the telescopic assembly further comprises at least one magnet, and a middle part of the at least one balance connecting rod is connected to the at least one magnet.

11. The telescopic mechanism according to claim 10, wherein the telescopic assembly further comprises a first connecting rod and a second connecting rod, one end of the first connecting rod and one end of the second connecting rod are both connected to a middle part of the balance connecting rod, the first connecting rod and the second connecting rod are disposed at two sides of the balance connecting rod respectively in the telescoping direction and are disposed at an interval in the first direction; and the at least one magnet comprises a first magnet and a second magnet, the first connecting rod is connected to the first magnet, and the second connecting rod is connected to the second magnet.

12. The telescopic mechanism according to claim 11, wherein a surface of the first connecting rod closer to the flexible display screen is provided with a first mounting groove, and the first magnet is disposed in the first mounting groove; and a surface of the second connecting rod closer to the flexible display screen is provided with a second mounting groove, and the second magnet is disposed in the second mounting groove.

13. The telescopic mechanism according to claim 1, further comprising two telescopic slide rails, wherein the two telescopic slide rails are disposed at two sides of the telescopic assembly in the first direction;

the telescopic slide rail comprises a plurality of guide rails, the plurality of guide rails comprises a first fixed guide rail, a second fixed guide rail and at least one intermediate guide rail; the at least one intermediate guide rail is connected sequentially between the first fixed guide rail and the second fixed guide rail; the first fixed guide rail is connected to the fixed part and the second fixed guide rail is connected to the movable part;

each of the intermediate guide rail and the second fixed guide rail comprises a guide rail body and a limiting part, the guide rail body is provided with a sliding groove, and the limiting part and the sliding groove are disposed on two opposite sides of the guide rail body respectively; and a limiting part of a first guide rail is disposed in a sliding groove of the second guide rail, and the first guide rail and the second guide rail are two connected guide rails among the plurality of guide rails.

14. The telescopic mechanism according to claim 13, wherein a maximum size of the limiting part of the first guide rail in a second direction is a first size, a size of an opening of the sliding groove of the second guide rail in the second direction is a second size, and the first size is greater than the second size; and the second direction is perpendicular to the telescoping direction and the first direction.

15. The telescopic mechanism according to claim 14, wherein a first side face of the limiting part is provided with a clamping groove, the first side face is a side face of the limiting part further away from a corresponding guide rail body, and the clamping groove extends from one end of the limiting part to the other end of the limiting part; and a groove bottom of the sliding groove is provided with a raised structure, and the raised structure is disposed in the clamping groove and disposed at one end of the sliding groove closer to the first fixed guide rail.

16. The telescopic mechanism according to claim 1, wherein an inner wall of a first side plate of a first sub-housing is provided with a first guide structure, an outer wall of a first side plate of a second sub-housing is provided with a second guide structure, the inner wall and the outer wall are at least partially opposite, the first guide structure matches the second guide structure, and the first sub-housing and the second sub-housing are two connected sub-housings among the plurality of sub-housings.

17. The telescopic mechanism according to claim 16, wherein the first guide structure is a guide groove, a length direction of the guide groove is identical with the telescoping direction, the second guide structure is a guide protrusion, and the guide protrusion is disposed in the guide groove.

18. The telescopic mechanism according to claim 16, wherein a bottom surface of the bottom plate of the second fixed sub-housing is provided with a bump, and the bottom surface is a surface of the bottom plate of the second fixed sub-housing further away from the flexible display screen; and each of a side edge of the bottom plate of the first fixed sub-housing and a side edge of the bottom plate of the at least one intermediate sub-housing is provided with a make-way port matching the bump.

19. A display device, comprising the flexible display screen and the telescopic mechanism as defined in claim 1, wherein the flexible display screen is connected to the telescopic mechanism.

* * * * *